US012702955B2

(12) United States Patent
Wu et al.

(10) Patent No.: US 12,702,955 B2
(45) Date of Patent: Aug. 11, 2026

(54) METHOD FOR PREPARING DURABLE HYDROPHILIC ULTRAFILTRATION MEMBRANE

(71) Applicant: Tiangong University, Tianjin (CN)

(72) Inventors: Chunrui Wu, Tianjin (CN); Jingguo She, Tianjin (CN); Haifu Gao, Tianjin (CN); Ziping Song, Tianjin (CN); Xiaolong Lv, Tianjin (CN)

(73) Assignee: Tiangong University, Tianjin (CN)

( * ) Notice: Subject to any disclaimer, the term of this patent is extended or adjusted under 35 U.S.C. 154(b) by 85 days.

(21) Appl. No.: 18/669,142

(22) Filed: May 20, 2024

(65) Prior Publication Data

US 2024/0399313 A1 Dec. 5, 2024

(30) Foreign Application Priority Data

May 30, 2023 (CN) ........................ 202310622567.1

(51) Int. Cl.

| | |
|---|---|
| ***B01D 67/00*** | (2006.01) |
| ***B01D 71/30*** | (2006.01) |
| ***B01D 71/68*** | (2006.01) |

(52) U.S. Cl.

CPC .... *B01D 67/00165* (2022.08); *B01D 67/0011* (2013.01); *B01D 71/30* (2013.01); *B01D 71/68* (2013.01); *B01D 2323/081* (2022.08)

(58) Field of Classification Search

CPC .......... B01D 67/00165; B01D 67/0011; B01D 71/30; B01D 71/68; B01D 2323/081; B01D 2325/36; B01D 61/145; B01D 2323/30; B01D 71/34; B01D 67/00

See application file for complete search history.

(56) References Cited

U.S. PATENT DOCUMENTS 5,531,893 A * 7/1996 Hu ........................ B01D 69/141 210/500.37

2022/0234007 A1* 7/2022 Kornfield ............... B01D 69/02

FOREIGN PATENT DOCUMENTS

| | | | | |
|---|---|---|---|---|
| CN | 113578062 A | * 11/2021 | ........... | B01D 69/122 |
| KR | 20250157863 A | * 11/2025 | ............ | B01D 71/68 |
| WO | WO-2022261703 A1 | * 12/2022 | ............ | B01D 69/10 |

OTHER PUBLICATIONS

English translation of CN-113578062-A by EPO (specification and claims). (Year: 2021).*

(Continued)

*Primary Examiner* — Inja Song

(74) *Attorney, Agent, or Firm* — Reising Ethington P.C.

(57) ABSTRACT

Provided is a method for preparing a durable hydrophilic ultrafiltration membrane. In the disclosure, a functional hydrophilic molecule is synchronously synthesized during conventional dissolution of a polymer membrane material; and a resulting casting solution (a nascent membrane) is introduced into a coagulation bath, which initiates a cross-linking reaction between the functional hydrophilic molecules to form a hydrophilic cross-linked network. A hydrophilic cross-linked interpenetrating network is formed in situ during polymer phase separation to limit movement of polymer chains and formation and growth of micelles, thereby forming a relatively uniform polymer interpenetrating network structure to obtain the durable hydrophilic ultrafiltration membrane with a relatively uniform membrane pore structure.

6 Claims, 1 Drawing Sheet

(56) References Cited

OTHER PUBLICATIONS

Cesteros, "A simple and green procedure to prepare poly(ethylene glycol) networks: Synthesis and properties", Green Chem., 2011, 13, 197-206, published on Dec. 1, 2010. (Year: 2010).*
English translation of KR-20250157863-A by PE2E. (Year: 2025).*

* cited by examiner

METHOD FOR PREPARING DURABLE HYDROPHILIC ULTRAFILTRATION MEMBRANE

CROSS-REFERENCE TO RELATED APPLICATIONS

This patent application claims the benefit and priority of Chinese Patent Application No. 202310622567.1 filed with the China National Intellectual Property Administration on May 30, 2023, the disclosure of which is incorporated by reference herein in its entirety as part of the present application.

TECHNICAL FIELD

The present disclosure belongs to the field of filtration membranes, relates to an ultrafiltration membrane, in particular to a method for preparing a durable hydrophilic ultrafiltration membrane.

BACKGROUND OF THE INVENTION

As global water shortages become increasingly severe, water purification and reuse play an increasingly important role in human and industrial activities. Membrane technology has become the mainstream of water purification technology due to its low cost and high efficiency. Ultrafiltration technology shows strong membrane structure adaptability, low operating pressure, high water production flux, and low operating cost, and could achieve efficient removal of colloidal particles, macromolecular organic matter, proteins, and microorganisms in water. The ultrafiltration technology has become the technology of choice for the next generation of urban and industrial wastewater recycling.

Ultrafiltration membranes mainly remove impurities in water through pore size sieving. However, due to the randomness of the phase separation in the preparation of ultrafiltration membranes by dry-wet phase separation, most of the resulting ultrafiltration membranes have a relatively wide pore size distribution, limiting the separation efficiency of separation membranes. From an analysis of a phase separation principle, a pore structure of the ultrafiltration membranes is mainly affected by migration and curing of polymer molecular chains in a casting solution during phase separation, namely formation, growth, and curing of polymeric micelles.

Therefore, it is the key to achieving a uniform pore structure of the ultrafiltration membranes by realizing controllable development of relatively random nucleation and growth of the polymeric micelles.

SUMMARY OF THE INVENTION

An object of the present disclosure is to provide a method for preparing a durable hydrophilic ultrafiltration membrane. The method constructs a cross-linked network in situ to assist phase separation, and a pore size of the durable hydrophilic ultrafiltration membrane is uniformed simultaneously by constructing a hydrophilic cross-linked interpenetrating network in situ during membrane production. The method also simultaneously improves permeation flux, separation performance, and antifouling capacity of the ultrafiltration membrane.

The technical solutions to achieve the object of the present disclosure are as follows:

In the present disclosure, a functional hydrophilic molecule is synthesized in situ through a one-pot method during conventional dissolution of a polymer membrane material. A resulting casting solution (a nascent membrane) is introduced into a coagulation bath, which initiates a cross-linking reaction between the functional hydrophilic molecules to form a cross-linked interpenetrating network with a molecular chain of the polymer membrane material in situ. Through the hydrophilic cross-linked interpenetrating network formed in situ, the phase separation is coordinated and controlled to limit movement of polymer chains and formation and growth of micelles, thereby forming a relatively uniform polymer interpenetrating network structure to finally obtain the durable hydrophilic ultrafiltration membrane with a relatively uniform membrane pore structure. The method realizes hydrophilization of the membrane materials and homogenization of the pore size synchronously during membrane preparation, and simultaneously improves permeation flux, separation performance and antifouling capacity of the ultrafiltration membrane.

In the present disclosure, the method includes the following steps:

stirring a polymer membrane material, an active molecule A, an active molecule B, and a solvent at a constant temperature, such that a functional hydrophilic molecule is synchronously synthesized in situ and a casting solution is obtained during conventional dissolution of the polymer membrane material; and preparing an ultrafiltration membrane from the casting solution by dry-wet phase separation, initiating a cross-linking reaction between the active molecule A and the active molecule B by using a coagulation bath, and curing into a membrane, namely a finished ultrafiltration membrane.

In some embodiments, based on a total amount of the casting solution being 100%, the polymer membrane material accounts for 13 wt % to 20 wt % of a weight of the casting solution, the solvent accounts for 55 wt % to 86 wt % of the weight of the casting solution, the active molecule A accounts for 1 wt % to 10 wt % of the weight of the casting solution, and the active molecule B accounts for 1 wt % to 15 wt % of the weight of the casting solution.

The polymer membrane material is a conventional polymer membrane material. In some embodiments, the polymer membrane material is selected from the group consisting of polyvinyl chloride (PVC), chlorinated PVC, polyvinylidene fluoride (PVDF), a PVDF-chlorotrifluoroethylene (CTFE) copolymer, polysulfone (PSF), polyethersulfone (PES), polyacrylonitrile (PAN), and a mixture of two or more thereof.

In some embodiments, the solvent is selected from the group consisting of N,N-dimethylformamide (DMF), dimethyl sulfoxide (DMSO), N,N-dimethylacetamide (DMAc), and a mixture of two or more thereof.

In some embodiments, the stirring is conducted at the constant temperature of 30° C. to 90° C. for 2 h to 48 h.

The active molecule A is a molecule including an amino group and a alkoxysilane group. In some embodiments, the active molecule A is selected from the group consisting of (3-aminopropyl)trimethoxysilane, 3-aminopropyltriethoxysilane, 3-aminopropyldimethylmethoxysilane, 3-aminopropyldiethoxymethylsilane, diethylenetriamino propyltrimethoxysilane, N-(2-aminoethyl)-3-aminopropyltrimethoxysilane, N-(2-aminoethyl)-3-aminopropylmethyldiethoxysilane, 3-piperazinylpropylmethyldimethoxysilane, and a mixture of two or more thereof.

In some embodiments, the active molecule B is selected from the group consisting of diglycidyl ether, glycerol diglycidyl ether, ethylene glycol diglycidyl ether, 1,6-hexanediol diglycidyl ether, polyethylene glycol diglycidyl ether, diethylene glycol diglycidyl ether, and a mixture of two or more thereof.

Where, an active molecule A could react with an active molecule B, and impart self-crosslinking characteristics to the active molecule B. The active molecule B is rich in hydrophilic groups. The active molecule A and the active molecule B are combined in a casting solution and cross-linked with polymer molecular chains in a coagulation bath to form a cross-linked interpenetrating structure. A synergistic effect of the active molecule A and the active molecule B is conducive to uniformization of pore size and promotes permeation flux, separation performances, and antifouling capacity of an ultrafiltration membrane.

In some embodiments, the coagulation bath is selected from the group consisting of an aqueous sodium hydroxide solution and an aqueous hydrogen chloride solution, with a concentration maintained of 0.1 wt % to 30 wt %, and a temperature of the coagulation bath is controlled between 25° C. and 80° C.

The ultrafiltration membrane refers to one of a flat membrane and a hollow fiber membrane.

The present disclosure has the following advantages and beneficial effects:

1. In the present disclosure, a coagulation bath initiates a cross-linking reaction between functional hydrophilic molecules, thereby forming a hydrophilic cross-linked interpenetrating network with a molecular chain of a polymer membrane material in situ, such that an ultrafiltration membrane achieves lasting hydrophilicity.

2. In the present disclosure, the hydrophilic cross-linked interpenetrating network formed in situ regulates phase separation and interferes with movement of polymer chains and formation and growth of micelles, thereby forming a relatively uniform polymer network structure to obtain the durable hydrophilic ultrafiltration membrane with a relatively uniform membrane pore structure.

3. In the present disclosure, the process for constructing the hydrophilic cross-linked interpenetrating network in situ realizes simultaneous improvement of permeation flux, separation performance, and antifouling capacity of the ultrafiltration membrane.

DETAILED DESCRIPTION OF THE INVENTION

Figure 1:
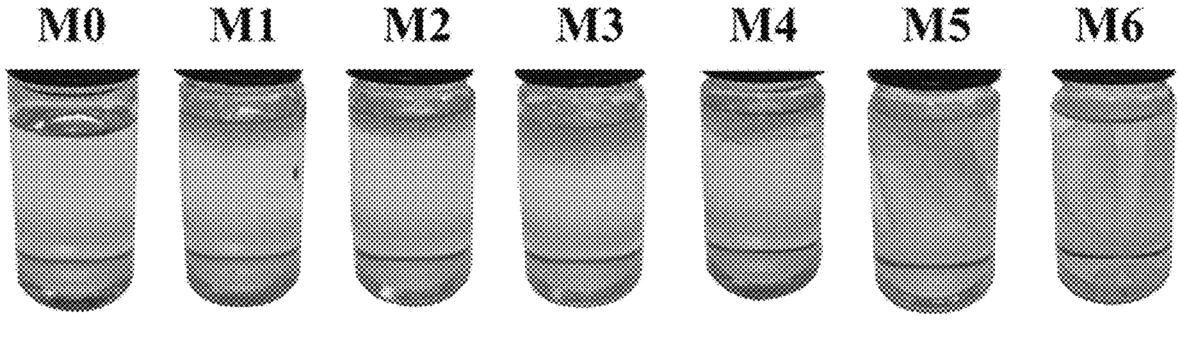
FIG. 1 shows a comparison of dissolution of ultrafiltration membranes with different additive amounts of active molecules in a solvent.

In order to better understand the purpose, structure and function of the present disclosure, the method for preparing an ultrafiltration membrane based on in-situ construction of cross-linked network-assisted phase separation according to the present disclosure will be described in further detail below.

Examples 1 to 10 and Comparative Example 1

13 wt % of a polymer membrane material, 5 wt % of an active molecule A, and 75 wt % of DMF (as a solvent) were weighed, and 7 wt % of an active molecule B was added thereto. A resulting mixture was stirred at a constant temperature of 40° C. for 48 h until completely dissolved to form a uniform solution. After membrane scraping, a resulting membrane was placed in a coagulation bath with a cross-linking factor to prepare a flat ultrafiltration membrane by phase inversion. Types of the active molecule A and the active molecule B and composition of the coagulation bath are shown in Table 1. The coagulation bath was at a temperature of 25° C.

TABLE 1

Effect of adding different reactive active molecules on properties of the flat membrane

| SN | | Membrane material | Active molecule A | Active molecule B | Coagulation bath | Water contact angle (*) | Water contact angle after 300 h of testing | Flux recovery rate (%) |
|---|---|---|---|---|---|---|---|---|
| Comparative Example 1 | Control Group 1 | PES | No addition | Polyethylene glycol diglycidyl ether | Deionized water (pH = 7) | 85 | 95 | 65 |
| | Control group 2 | PES | 3-aminopropyl triethoxysilane | No addition | Deionized water (pH = 7) | 93 | 93 | 75 |
| Example 1 | Experimental group | PES | 3-aminopropyl triethoxysilane | Polyethylene glycol diglycidyl ether | Deionized water (pH = 7) | 60 | 60 | 96 |
| Example 2 | Experimental group | PES | 3-aminopropyl dimethyl-methoxysilane | Polyethylene glycol diglycidyl ether | Deionized water (pH = 1) | 66 | 56 | 93 |
| Example 3 | Experimental group | PVDF | 3-aminopropyl diethoxy-methylsilane | Diglycidyl ether | Deionized water (pH = 5) | 62 | 62 | 90 |

TABLE 1-continued

Effect of adding different reactive active molecules on properties of the flat membrane

| | SN | Membrane material | Active molecule A | Active molecule B | Coagulation bath | Water contact angle (*) | Water contact angle after 300 h of testing | Flux recovery rate (%) |
|---|---|---|---|---|---|---|---|---|
| Example 4 | Experimental group | PSF | Diethylene-triamino propyltri-methoxysilane | Diglycidyl ether | Deionized water (pH = 7) | 46 | 46 | 95 |
| Example 5 | Experimental group | PVDF-CTFE copolymer | N-(2-aminoethyl)-3-amino-propyltri-methoxysilane | Glycerol diglycidyl ether | Deionized water (pH = 9) | 65 | 65 | 93 |
| Example 6 | Experimental group | Chlorinated PVC | N-(2-aminoethyl)-3-aminopropyl methyldiethoxy-silane | Glycerol diglycidyl ether | Deionized water (pH = 11) | 58 | 58 | 90 |
| Example 7 | Experimental group | PVC | (3-aminopropyl) trimethoxy-silane | 1,6-hexanediol diglycidyl ether | Deionized water (pH = 13) | 60 | 60 | 89 |
| Example 8 | Experimental group | PVC | (3-aminopropyl) trimethoxy-silane | Diethylene glycol diglycidyl ether | Deionized water (pH = 10) | 65 | 65 | 89 |
| Example 9 | Experimental group | PVC | (3-aminopropyl) trimethoxy-silane | Ethylene glycol diglycidyl ether | Deionized water (pH = 2) | 66 | 66 | 87 |
| Example 10 | Experimental group | PAN | 3-piperazinyl-propylmethyl dimethoxysilane | Ethylene glycol diglycidyl ether | Deionized water (pH = 7) | 63 | 63 | 93 |

Table 1 shows the effects of adding different active molecules A and B to a casting solution on hydrophilicity and antifouling capacity of the ultrafiltration membrane. Comparative Example 1 is a control group, and Examples 1 to 10 are experimental groups. By adding a certain amount of the different active molecules A, such as the (3-amino-propyl)trimethoxysilane, the 3-aminopropyltriethoxysilane, the 3-aminopropyldimethylmethoxysilane, the 3-aminopro-pyldiethoxymethylsilane, the diethylenetriamino propyl-trimethoxysilane, the N-(2-aminoethyl)-3-amino-propyl-trimethoxysilane, the N-(2-aminoethyl)-3-aminopropylmethyldiethoxysilane, and the 3-piperazinylpropylmethyldimethoxysilane, and the different active molecules B, such as the diglycidyl ether, the glycerol diglycidyl ether, the ethylene glycol diglycidyl ether, the 1,6-hexanediol diglycidyl ether, the polyethylene glycol diglycidyl ether, and the diethylene glycol diglycidyl ether, to the polymer membrane material such as the PVC, the chlorinated PVC, PVDF, the PVDF-CTFE copolymer, the PSF, the PES, and the PAN, excellent long-lasting hydrophilicity and antifouling capacity could be achieved, indicating that the method is universal.

In Example 1, a flat ultrafiltration membrane is prepared using the PES as the polymer membrane material, the 3-aminopropyltriethoxysilane as the active molecule A, and the polyethylene glycol diglycidyl ether as the active molecule B. Compared with only the active molecule A added in the control group 1 of Comparative Example 1 or only the active molecule B added in the control group 2 of Comparative Example 1, the ultrafiltration membrane obtained in Example 1 has a lower water contact angle and the water contact angle remains stable after running in pure water for 300 h. Moreover, the flux recovery rate of the ultrafiltration membrane obtained in Example 1 is also significantly improved compared with that of the control groups. It was proved that by simultaneously introducing a certain amount of the active molecule A and the active molecule B into the casting solution, the hydrophilicity of the ultrafiltration membrane is improved and lasting hydrophilicity is obtained, and the antifouling capacity of the ultrafiltration membrane is improved.

Examples 11 to 16

20 wt % of PES (as the polymer membrane material), a certain amount of 3-aminopropyltriethoxysilane and ethylene glycol diglycidyl ether, and solvent as a balance were weighed (a total amount of a casting solution was maintained at 100%). The resulting weighed materials were stirred at a constant temperature of 80° C. for 24 h until completely dissolved to form a uniform solution. After membrane scraping, the membrane was placed in a coagulation bath with a cross-linking factor to prepare a flat ultrafiltration membrane by phase inversion. Additive amounts of 3-aminopropyltriethoxysilane and ethylene glycol diglycidyl ether are shown in Table 2. The coagulation bath was deionized water with pH=8.5, and the coagulation bath had a temperature of 80° C.

TABLE 2

Effect of additive amount of reactive active molecules on properties of a PES-based hollow fiber membrane

| SN | Additive amount of 3-aminopropyltri ethoxysilane (%) | Additive amount of ethylene glycol diglycidyl ether (%) | Water contact angle (°) | Proportion of cross-linked structure (%) | Flux (L/m$^{-2}$ h bar) | BSA retention rate (%) | Flux recovery rate (%) |
|---|---|---|---|---|---|---|---|
| Example 11 | 1 | 1 | 70 | 10 | 232.1 | 98.0 | 90 |
| Example 12 | 1 | 5 | 60 | 15 | 619.1 | 98.9 | 98 |
| Example 13 | 5 | 5 | 59 | 18 | 702.4 | 98.4 | 98 |
| Example 14 | 5 | 10 | 55 | 35 | 934.2 | 98.1 | 98 |
| Example 15 | 10 | 10 | 45 | 50 | 1,221.9 | 98.9 | 99 |
| Example 16 | 10 | 15 | 45 | 50 | 1,300 | 98.3 | 99 |

Table 2 shows the effect of additive amounts of an active molecule A and an active molecule B on the properties of the PES-based hollow fiber ultrafiltration membrane. Examples 11 to 16 were the preparation of the ultrafiltration membranes by adding different amounts of the active molecule A and the active molecule B to the casting solution. As shown in Examples 11 and 12, Examples 13 and 14, and Examples 15 and 16, as the additive amount of the reactive active molecules increases, the proportion of the cross-linked structure in the ultrafiltration membrane increases, and the flux of the ultrafiltration membrane shows an increasing trend and maintains a stable retention rate of BSA molecules, the water contact angle is significantly reduced, and the flux recovery rate increases. It is proven that increasing the additive amount of reactive active molecules could help improve hydrophilicity, antifouling capacity, and filtration performance of the ultrafiltration membrane.

Figure 2:
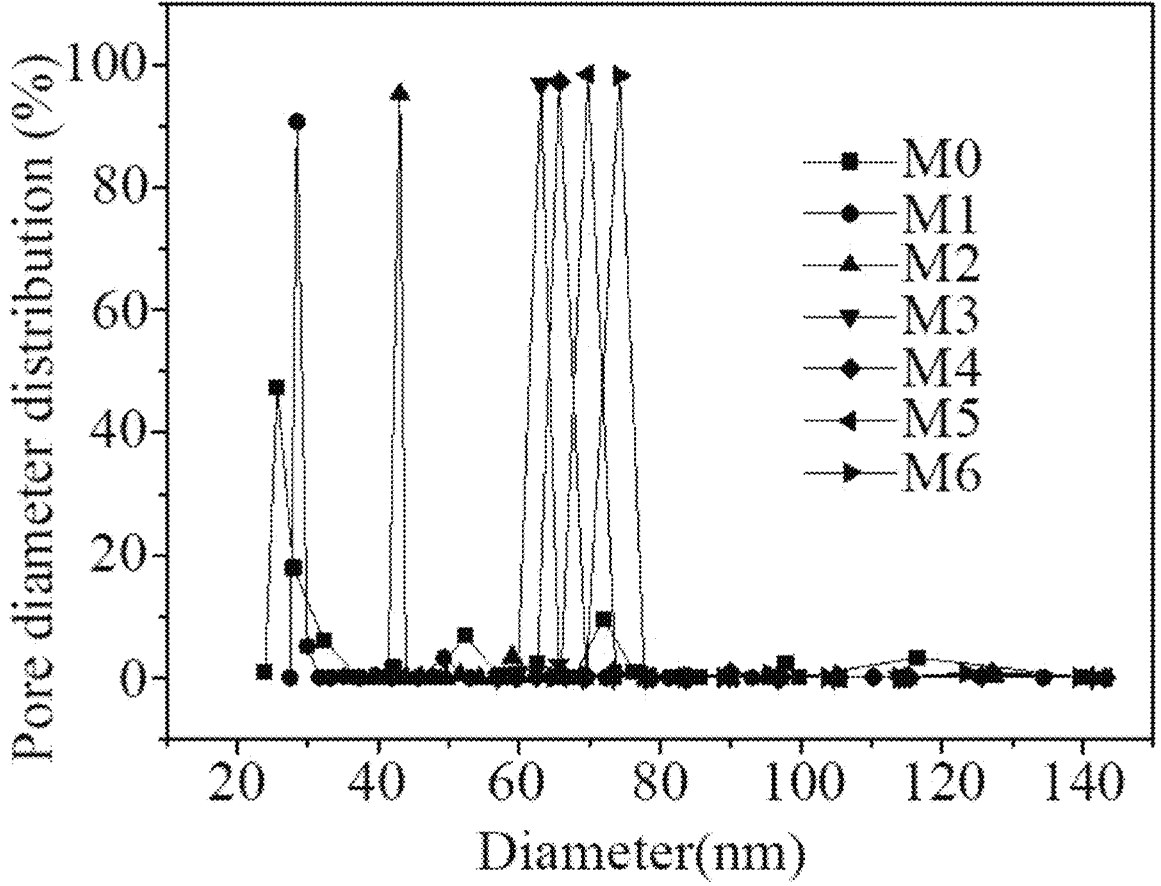
FIG. 2 shows a comparison of pore diameter and pore diameter distribution of the ultrafiltration membranes with different additive amounts of active molecules.

The dissolution of the ultrafiltration membranes obtained in Examples 11 to 16 in a solvent DMAc is shown in FIG. 1, where M0 is the ultrafiltration membrane of control group 1 without adding active molecule A, while M1, M2, M3, M4, M5, and M6 correspond to Examples 11, 12, 13, 14, 15, and 16 for comparison with the control group M0, respectively. As the additive amount of the active molecule A and the active molecule B increases, the ultrafiltration membrane gradually becomes insoluble, and an amount of insoluble residue shows an increasing trend, and an appearance of the residue also changes from flocculent to a complete membrane. This proves the successful construction of a hydrophilic cross-linked network. The pore diameter and pore diameter distribution of the ultrafiltration membranes obtained in Examples 11 to 16 are shown in FIG. 2, where M0 is the control group 1 of Comparative Example 1, while M1, M2, M3, M4, M5, and M6 correspond to Examples 11, 12, 13, 14, 15, and 16 for comparison with the control group 1 M0, respectively. After adding the active molecule A and the active molecule B, the pore size of the ultrafiltration membrane becomes more uniform from the wider distribution of M0. Moreover, the improvement in the additive amounts of the active molecule A and the active molecule B increases an average pore size of the ultrafiltration membrane while keeping a maximum pore size consistent, thus helping improve the separation efficiency of the ultrafiltration membrane. This proves that the pore size of the ultrafiltration membrane is uniform after adding the active molecule A and the active molecule B.

In the present disclosure, a functional hydrophilic molecule is synchronously synthesized and a uniform casting solution is obtained during dissolution of the polymer membrane material. Further, the casting solution is prepared by dry-wet phase separation into an ultrafiltration membrane, a cross-linking reaction between an active molecule A and an active molecule B is initiated with a coagulation bath, and cured into a membrane, namely a finished ultrafiltration membrane.

The present disclosure is described in conjunction with the examples, and those skilled in the art should know that various changes or equivalent substitutions can be made to the features and examples of the present disclosure without departing from the spirit and scope of the present disclosure. In addition, under the concept of the present disclosure, these features and examples can be modified to adapt to specific conditions and materials without departing from the spirit and scope of the present disclosure. Therefore, the present disclosure is not limited by the disclosed specific examples, and all examples falling within the scope of the claims of this application should belong to the scope of the present disclosure.

The invention claimed is:

1. A method for preparing a hydrophilic ultrafiltration membrane, comprising the following steps:

stirring a polymer membrane material, an active molecule A, an active molecule B, and a solvent at a constant temperature, such that during dissolution of the polymer membrane material, functional hydrophilic molecules are synchronously synthesized and a casting solution is obtained; and preparing an ultrafiltration membrane from the casting solution by dry-wet phase separation, initiating a cross-linking reaction between the functional hydrophilic molecules by using a coagulation bath to form a cross-linked network in situ; allowing the cross-linked network and a molecular chain of the polymer membrane material to jointly form a cross-linked interpenetrating network during the dry-wet phase separation; and controlling the dry-wet phase separation by forming cross-links in situ to limit movement of polymer chains and formation and growth of micelles, thereby forming a uniform polymer interpenetrating network structure to obtain the hydrophilic ultrafiltration membrane with a uniform membrane pore structure;

wherein the active molecule A is a molecule comprising an amino group and a alkoxysilane group and the active molecule B is a diglycidyl ether functional hydrophilic molecule;

wherein the polymer membrane material is selected from the group consisting of polysulfone (PSF), polyethersulfone (PES), polyacrylonitrile (PAN), and a mixture of two or more thereof; and wherein the active molecule B is selected from the group consisting of diglycidyl ether, glycerol diglycidyl ether, ethylene glycol diglycidyl ether, 1,6-hexanediol diglycidyl ether, polyethylene glycol diglycidyl ether, diethylene glycol diglycidyl ether, and a mixture of two or more thereof.

2. The method of claim 1, wherein based on a total amount of the casting solution being 100%, the polymer membrane material accounts for 13 wt % to 20 wt % of a weight of the casting solution, the solvent accounts for 55 wt % to 86 wt % of the weight of the casting solution, the active molecule A accounts for 1 wt % to 10 wt % of the weight of the casting solution, and the active molecule B accounts for 1 wt % to 15 wt % of the weight of the casting solution.

3. The method of claim 1, wherein the active molecule A is selected from the group consisting of (3-aminopropyl) trimethoxysilane, 3-aminopropyltriethoxysilane, 3-aminopropyldimethylmethoxysilane, 3-aminopropyldiethoxymethylsilane, diethylenetriamino propyltrimethoxysilane, N-(2-aminoethyl)-3-amino-propyltrimethoxysilane, N-(2-aminoethyl)-3-aminopropylmethyldiethoxysilane, 3-piperazinylpropylmethyldimethoxysilane, and a mixture of two or more thereof.

4. The method of claim 1, wherein the solvent is selected from the group consisting of N,N-dimethylformamide (DMF), dimethyl sulfoxide (DMSO), N,N-dimethylacetamide (DMAc), and a mixture of two or more thereof.

5. The method of claim 1, wherein the stirring is conducted at the constant temperature of 30° C. to 90° C. for 2 h to 48 h.

6. The method of claim 1, wherein the coagulation bath is selected from the group consisting of an aqueous sodium hydroxide solution and an aqueous hydrogen chloride solution, the aqueous sodium hydroxide solution and the aqueous hydrogen chloride solution each have a concentration of 0.1 wt % to 30 wt %, and a temperature of the coagulation bath is controlled between 25° C. and 80° C.

* * * * *